United States Patent Office 2,721,621
Patented Oct. 25, 1955

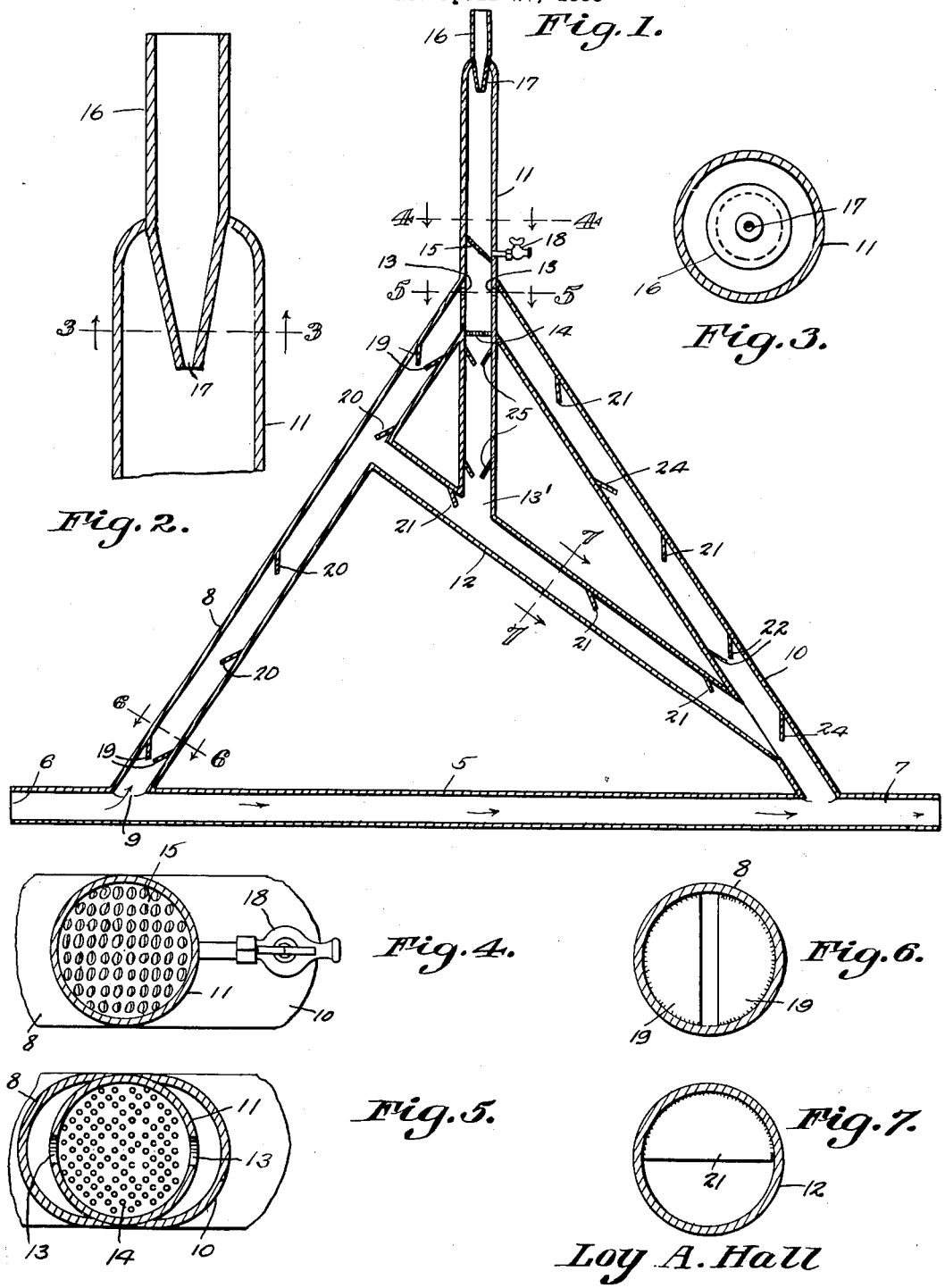

2,721,621

GAS AND OIL SEPARATING APPARATUS

Loy A. Hall, Stroud, Okla.

Application April 27, 1953, Serial No. 351,235

3 Claims. (Cl. 183—2.7)

This invention relates to an apparatus designed for separating gas from oil for recovering gas for fuel purposes.

An important object of the invention is to provide an oil and gas separator embodying no movable parts, to the end that the cost of operation in separating gas from oil will be reduced to a minimum.

Another object of the invention is to provide a gas and oil separator wherein the various pipes thereof are supplied with internal baffles or orifice plates, against which the gases, rising within the pipes of the apparatus and which carry a certain amount of oil, contact, retarding the upward movement of the oil, thereby separating the gas from the oil within the pipes of the apparatus, the gas passing upwardly while the oil gravitates to the lowermost pipe of the apparatus.

With the foregoing and other objects in view which will appear as the description proceeds, the invention consists of certain novel details of construction and combinations of parts hereinafter more fully described and pointed out in the claims it being understood that changes may be made in the construction and arrangement of parts without departing from the spirit of the invention as claimed.

Referring to the drawings,

Figure 1 is a sectional view through a gas and oil separating apparatus, constructed in accordance with the invention.

Fig. 2 is a vertical sectional view through the uppermost end of the upper pipe of the apparatus.

Fig. 3 is a sectional view taken on line 3—3 of Fig. 2.
Fig. 4 is a sectional view taken on line 4—4 of Fig. 1.
Fig. 5 is a sectional view taken on line 5—5 of Fig. 1.
Fig. 6 is a sectional view taken on line 6—6 of Fig. 1.
Fig. 7 is a sectional view taken on line 7—7 of Fig. 1.

Referring to the drawing in detail, the apparatus comprises a lower horizontal pipe 5 having the open inlet end 6 and an open outlet end 7. The reference character 8 indicates an inclined pipe which communicates with the pipe 5, through the opening 9, while at the opposite end of the horizontal pipe 5 is the upstanding pipe 10 which is inclined rearwardly, the upper ends of the pipes 8 and 10 being connected with the pipe 11. The pipe 11 extends below the upper ends of pipes 8 and 10 and has communication with a pipe 12, through the opening 13'. The lower end of the pipe 12 connects with the pipe 10 adjacent to the lower end thereof, while the upper end of pipe 12 connects with and is in communication with pipe 8, as clearly shown by Fig. 1 of the drawing.

Communication is established between pipes 8 and 10 and the pipe 11, through openings 13 formed in the pipe 11, so that gas passing upwardly through pipes 8 and 10 may enter the pipe 11 through openings 13. Located within the pipe 11, at a point below the openings 13, is a perforated dividing disc 14, while directly above the openings 13 and disposed within the pipe 11, is the inclined perforated disc 15, the openings of the disc 15 being slightly larger than the openings in the disc 14 to reduce the resistance offered by the disc, to the upwardly moving gas.

The upper end of the pipe 11 is closed by a pipe 16 which has its lower end extended a substantial distance within the upper end of the pipe 11 where it is rounded in construction to provide a contracted discharge opening 17. The reference character 18 indicates a valve for draining any oil or water which may collect in the pipe 11. The valve 18 may also be used for the outlet of gas which may be carried off to a storage tank or burner to be supplied with gas from the apparatus.

Arranged within the pipe 8, are baffles 19 disposed in pairs adjacent to the upper and lower ends of pipe 8, the baffles 19 being inclined downwardly with their adjacent inner edges spaced so that gas may pass upwardly therebetween. Baffles 20 are also arranged within the pipe and extend inwardly from opposite sides thereof.

Baffles 21 extend downwardly from the wall of the pipe 12 and are arranged in spaced relation with respect to each other so that gas laden with oil and passing upwardly in pipe 12, will contact the baffles in such a way that the gas will necessarily pass over the free edges of the baffles, the oil being retarded by the baffles to drop into the pipe 12 and be returned to the pipe 5.

The pipe 10 is also provided with a pair of baffles 22 that have their inner edges spaced apart providing a passageway between which the gas may ascend through the pipe 10. Baffles 22 are secured within the wall of the pipe 10 and are inclined downwardly, as shown by Fig. 1 of the drawing, the baffles acting to retard the passage of gas upwardly through the pipe 10 to cause the oil to become separated from the gas by gravity.

The pipe 11, which also communicates with pipe 12 through the opening 13', is supplied with pairs of baffles 25 that are inclined downwardly and have their adjacent edges spaced apart providing passageways between which the gas arising in pipe 11 may pass upwardly to the upper portion of the pipe 11 to be exhausted through pipe 16 or valve 18.

In operation, the apparatus is positioned with the pipe 5 placed at any desirable point on the flow line between the well and tank battery, the gas-laden oil passing in the direction of the arrows in Fig. 1 of the drawing.

It is obvious that as the oil passes through the pipe 5, the gases will rise in the pipes 8 and 10, the oil which may be contained in the gas, contacting the baffles 19 and 20 of the pipe 8 as well as the baffles 21 of pipe 12 and baffles 24 of pipe 10, the oil becoming separated from the gas to flow by gravity through the pipes 8, 10 and 12, to the main pipe 5 of the apparatus, to be carried off to the place of deposit.

Gas which collects in pipe 12 will pass upwardly through the spaces between the baffles 25 and contact with the perforated dividing discs 14 and 15 which are located within pipe 11 to retard the movement of oil upwardly separating the gas, the gas collecting in the upper end of pipe 11 to be carried off either through the valve 18 or pipe 16, as desired.

The gas which is recovered in this manner, is of a highly volatile nature, and is exceptionally light, thereby insuring the gas passing readily to the upper portion of the pipe 11 to be carried off as desired.

Having thus described the invention, what is claimed is:

1. In a gas and oil separator, a horizontal main pipe through which oil is directed, upwardly extended inclined pipes communicating with said main pipe adjacent to the ends thereof, a vertical gas outlet pipe to which said upwardly extended pipes are connected, said vertical gas pipe having openings establishing communication between the vertical gas outlet pipe and said upwardly extended inclined pipes through which gas passes into said vertical gas outlet pipe, an inclined pipe extending between said upwardly extended pipes in communication therewith, through which oil and gas pass between said upwardly extended pipes, and inclined baffles extending inwardly from the walls of said pipes, separating the gas and oil as the oil laden gas passes upwardly through the pipes.

2. In a gas and oil separator, a horizontal main pipe through which oil is directed, upwardly extended pipes connected adjacent the ends thereof with said main pipe, a vertical gas outlet pipe to which said upwardly extended pipes are connected, said vertical gas pipe having openings establishing communication between the vertical gas outlet pipe and said upwardly extended pipes through which gas passes into said vertical gas outlet pipe, said vertical gas outlet pipe also having its lower end communicating with another inclined upwardly extended pipe, into which oil separated from gas passing into said vertical gas outlet pipe, flows by gravity into said inclined pipe, and inclined baffles extending inwardly from the walls of said pipes separating the gas and oil as the oil laden gas passes upwardly through the pipes.

3. In a gas and oil separator, a substantially horizontal main pipe through which gas laden oil is directed, upwardly extended inclined pipes communicating with said main pipe, a vertical gas outlet pipe to which said upwardly inclined pipes are connected, said vertical gas pipe having openings establishing communication between the vertical gas outlet pipe and said upwardly inclined pipes through which gas passes into said vertical gas outlet pipe, downwardly inclined baffles extending inwardly from the walls of said pipes retarding movement of the oil laden gas separating the gas and oil, and spaced apertured transverse and inclined discs fitted within the vertical gas outlet pipe obstructing the passage of oil and gas upwardly through said vertical gas pipe further separating the gas and oil.

References Cited in the file of this patent

UNITED STATES PATENTS

| | | |
|---|---|---|
| 520,675 | Gindele | May 29, 1894 |
| 1,174,743 | Leet | Mar. 7, 1916 |
| 1,177,129 | Mulvany | Mar. 28, 1916 |
| 1,718,013 | Waters | June 18, 1929 |
| 1,722,870 | Waters | July 30, 1929 |
| 1,780,101 | Wagner | Oct. 28, 1930 |
| 2,016,641 | Lincoln | Oct. 8, 1935 |
| 2,387,208 | Wood | Oct. 16, 1945 |

FOREIGN PATENTS

| | | |
|---|---|---|
| 349,729 | Great Britain | June 4, 1931 |
| 457,784 | Great Britain | Dec. 4, 1936 |